United States Patent
Lal et al.

(10) Patent No.: US 10,768,398 B2
(45) Date of Patent: Sep. 8, 2020

(54) SOLAR-CONCENTRATING SOLARIZATION APPARATUS, METHODS, AND APPLICATIONS

(71) Applicant: CORNELL UNIVERSITY, Ithaca, NY (US)

(72) Inventors: Amit Lal, Ithaca, NY (US); Serhan Ardanuc, Ithaca, NY (US)

(73) Assignee: CORNELL UNIVERSITY, Ithaca, NY (US)

(*) Notice: Subject to any disclaimer, the term of this patent is extended or adjusted under 35 U.S.C. 154(b) by 295 days.

(21) Appl. No.: 14/426,242

(22) PCT Filed: Sep. 9, 2013

(86) PCT No.: PCT/US2013/058696
§ 371 (c)(1),
(2) Date: Mar. 5, 2015

(87) PCT Pub. No.: WO2014/039943
PCT Pub. Date: Mar. 13, 2014

(65) Prior Publication Data
US 2015/0219885 A1    Aug. 6, 2015

Related U.S. Application Data

(60) Provisional application No. 61/698,478, filed on Sep. 7, 2012.

(51) Int. Cl.
*F24J 2/00*    (2014.01)
*G02B 19/00*    (2006.01)
(Continued)

(52) U.S. Cl.
CPC ......... *G02B 19/0042* (2013.01); *A01G 9/246* (2013.01); *A01G 11/00* (2013.01);
(Continued)

(58) Field of Classification Search
CPC ...... A01M 21/04; A01M 3/007; A01M 19/00; A01M 7/00; A01G 1/00; A01G 1/001;
(Continued)

(56) References Cited

U.S. PATENT DOCUMENTS

| | | | |
|---|---|---|---|
| 5,787,878 A | 8/1998 | Ratliff, Jr. | |
| 7,192,146 B2 * | 3/2007 | Gross | F24J 2/38 359/853 |

(Continued)

FOREIGN PATENT DOCUMENTS

| | | |
|---|---|---|
| JP | 2000184828 A | 7/2000 |
| JP | 2003116349 A | 4/2003 |
| WO | 2009/126263 | 10/2009 |

OTHER PUBLICATIONS

International Search Report and Written Opinion Form PCT/ISA/220, International Application No. PCT/US2013/058696, pp. 1-14, International Filing Date Sep. 9, 2013.

(Continued)

*Primary Examiner* — Thanh Pham
(74) *Attorney, Agent, or Firm* — Bond, Schoeneck & King, PLLC; Blaine Bettinger

(57) ABSTRACT

Methods, structures, devices and systems are disclosed for solarizing soil using a moveable optical focusing array. In one example, an apparatus to solarize soil from a moveable platform includes a vehicle, an array of mirrors located on the exterior of the vehicle, in which the mirrors are steerable to control the orientation of the mirrors to direct sunlight to a spot on soil that generates heat to a solarize the soil, and a sensor coupled to the vehicle to measure the temperature of the soil, in which the orientation of the mirrors is determined based at least in part on the measured temperature to control the temperature of the soil.

15 Claims, 12 Drawing Sheets

(51) Int. Cl.
*A01M 21/04* (2006.01)
*A01M 3/00* (2006.01)
*A01G 11/00* (2006.01)
*A01M 17/00* (2006.01)
*A01M 19/00* (2006.01)
*A01G 9/24* (2006.01)
*F24S 20/00* (2018.01)
*G02B 26/08* (2006.01)
*G02B 27/00* (2006.01)

(52) U.S. Cl.
CPC ............ *A01M 3/007* (2013.01); *A01M 17/00* (2013.01); *A01M 19/00* (2013.01); *A01M 21/04* (2013.01); *F24S 20/00* (2018.05); *G02B 19/0023* (2013.01); *G02B 26/0816* (2013.01); *G02B 27/0006* (2013.01); *Y02A 40/268* (2018.01)

(58) Field of Classification Search
CPC . A01G 11/00; A01G 9/20; A01G 9/24; A01G 9/243; A01G 9/246; A01G 7/04; A01G 7/00
See application file for complete search history.

(56) References Cited

U.S. PATENT DOCUMENTS

| | | | | |
|---|---|---|---|---|
| 7,203,004 | B2* | 4/2007 | Zhang | F21S 11/00 126/577 |
| 2009/0114210 | A1 | 5/2009 | Guice et al. | |
| 2011/0101253 | A1 | 5/2011 | Lal et al. | |
| 2011/0167716 | A1* | 7/2011 | Myntti | A01G 9/243 47/17 |
| 2011/0259318 | A1 | 10/2011 | Kinley | |
| 2012/0163937 | A1* | 6/2012 | Zemaitatis | B60P 7/10 410/2 |
| 2012/0174477 | A1* | 7/2012 | Kleinwaechter | A01G 9/1438 47/17 |
| 2012/0201016 | A1* | 8/2012 | Robertson | F21L 4/08 362/183 |
| 2013/0284524 | A1* | 10/2013 | Collins | B60K 6/46 180/2.2 |
| 2014/0014159 | A1* | 1/2014 | Polk | H01L 31/18 136/246 |

OTHER PUBLICATIONS

Ardanuc, Serhan, et al., Concentrated Solar Power Harvesting Using Self-powered, Wireless, Thin-profile, Lightweight Solar Tiles, Journal of Solar Energy Engineering, Aug. 2011, vol. 133, pp. 035001-1 to 035001-7; copyright 2011 by ASME.

Johnson, David W., et al., Response of Seed of 10 Weed Species to Fresnel-lens-concentrated Solar Radiation, Weed Technology, vol. 4, No. 1, 1990, pp. 109-114.

Phitthayarachasak, Thanathep, et al., Solar energy system reduces time taken to inhibit microbial growth in soil, Renewable Energy vol. 34, Issue 11, Nov. 2009, pp. 2467-2473.

* cited by examiner

SOLAR-CONCENTRATING SOLARIZATION APPARATUS, METHODS, AND APPLICATIONS

RELATED APPLICATION DATA

The instant application claims priority to U.S. provisional Application Ser. No. 61/698,478 filed on Sep. 7, 2012, the subject matter of which is incorporated herein by reference in its entirety.

TECHNICAL FIELD

Embodiments of the present invention relate generally to the field of solar-effected technology; more particularly, to a solar-concentrating solarization apparatus, methods, and applications; and, by example, to a soil solarization application.

BACKGROUND

Conventional soil solarization is a technique that involves the use of solar power for controlling disease agents in the soil and decontaminating soil using sunlight; e.g., mulching the soil and covering it with a transparent polyethylene tarp to trap solar energy and therefore heat the soil.

Control of plant adversaries such as nematodes, disease causing bacteria, fungi, weeds, and soil-borne pests is beneficial for healthy plants and improved yields in agriculture. Pre-plant treatment of soil by fumigants is very effective for this purpose and has been widely used in the US and throughout the world, along with conventional agricultural practices. The additional cost of fumigation originating from labor, pesticides and materials, and machine use was compensated for by increased crop output and quality.

Soil fumigation was typically accomplished with the use of methyl bromide (MB) as a fumigant. Methyl bromide, however, is an extremely toxic chemical; its exposure experimentally linked to higher rates of cancer. Documented effects of MB exposure range from skin and eye irritation to death with most fatalities and injuries occurring when methyl bromide was used as a fumigant. In addition to its acute and chronic health risks, methyl bromide is a highly active green-house gas and has been classified as a Class I stratospheric ozone-depleting chemical. Therefore, the use of MB and related ozone-depleting compounds has been banned by the 1987 Montreal and 1997 Kyoto Protocols.

Notwithstanding the phase-out regulations imposed by international treaties, MB fumigation has been allowed through 'critical use exemptions,' which allow continued use of MB when there is not an adequate alternative. These exemptions, along with the large outgas sing of MB-treated products and containers shipped internationally, are a source of MB related health problems to people who are far from the site of original fumigant application of MB.

Other fumigants like metam sodium and chloropicrin, which can be considered as alternatives to MB, are considered not as effective and are also controlled by regulations that prohibit the use of fumigants in certain geographical areas that are close to schools and houses. Although fumigation is a costly process and may necessitate weeks long airing time, not having an economically viable method of a soil pretreatment agent such as MB has had a negative effect on growers' net income. For instance, in 2008 California strawberry growers using alternatives incurred a 14% decline in gross revenue in comparison to those using MB. As the number of critical use exemptions for MB fumigation decrease in the coming years due to MB phase-out regulations, an additional adverse impact on the $1.8 billion strawberry industry, for example, can be expected. Industries for other high-value crops that had relied on MB fumigation will also experience losses. Therefore, there is an immediate and strong need for a technically and economically viable method (and related apparatus) for soil disinfection/sterilization/de-weeding that is sustainable, organic, and is not toxic to people or the environment.

Conventional soil solarization is performed by covering soil with plastic sheets and sealing them around the edges. Natural sunlight heats the soil and the plastic traps the heat under the plastic. This process can take several weeks (3-8 weeks are typical) for satisfactory disinfestation/pasteurization results. The temperature inside the tarp is highly dependent on the weather conditions (outside temperature, day/night time, cloudiness), soil characteristics (composition, type, humidity), and plastic thickness. Temperature is highest at or near the surface of the soil, with reported typical (for a site in California, USA) maximum/minimum temperatures of 50/37° C. at 10 cm and 43/38° C. at 20 cm. Soil temperatures as high as 70° C. have been reported for bagged, isolated, or thin (<12") piles of soil under certain plastic covering conditions.

Soil solarization is a tremendous improvement over using chemical fumigation in terms of environmental impact; however, it still requires a large amount of plastic, which needs to be disposed after use as small holes and damage over three to eight weeks of solar exposure treatment makes reuse impractical. Often times the plastic is buried or burned, leading to a significant environmental impact. Biodegradable plastics are not used due to their higher opacity to sunlight, less durability to installation, and higher costs.

In addition to the environmental impact of the plastics used, there are several drawbacks of conventional soil solarization that make it less attractive than chemical fumigation to farmers:

a) Treatment time: In general, three to eight weeks of soil heating during the warmest time of the year is sufficient to control most soil pests. In some cases, such as in cooler, windier, or cloudier locations, or if there are pests that are harder to control, it may be necessary to leave the plastic in place for three to eight weeks. This is a significant penalty to the farmer in terms of time lost for crop growth. This lost time period may limit the number of crop cycles that can be harvested in one year, reducing farm yield.

b) Performance/(Cost/Acre): Even though the cost of conventional soil-solarization is lower than that of chemical fumigants, the performance achieved is not sufficient to substantiate the lower cost.

c) Applicability: Soil solarization is practical only in hot climates with sufficient sun exposure; e.g., California, Arizona, Florida. A farmer in New York or Ohio cannot regularly benefit from soil solarization as the sunlight is not sufficient in the early spring and late fall seasons of crop planting. In addition, solarization efficiency can be reduced by cloud cover, cool air temperatures, and precipitation events during the treatment period.

Solarization as described hereinabove is a passive process whose incident power is limited by that of the natural sun-light; i.e., approximately 1 kW/m² at its maximum. This can be increased by concentrating the solar power to increase the solar power density by X suns. The literature shows that the time required to kill a certain fraction of a population of a certain species of a weed is a very steep function of temperature, with only a 4° C. decrease in temperature having an impact on the success of de-weeding.

Many thermal processes are nonlinear functions of temperature; for example, DNA unravels from a double-strand state to single-strand state at 90° C. in polymerase chain reaction. Many proteins denature at high temperatures above a certain threshold. Hence treating soils to higher temperatures can accelerate soil sterilization. Achieving the higher temperatures can be achieved by concentrating sunlight to increase the power to the exposed surface.

Early use of concentrated sun-light for solarization was shown by Johnson et al. in 1989. As shown in FIG. 1, a Fresnel lens was used to concentrate sunlight by a 25× factor over a rectangular region of 1 cm×150 cm. The authors demonstrated that within one second of exposure, the surface temperature could rise to 290° C. This heat treatment over an exposure time of 1-10 seconds was sufficient to kill kochia, redroot pigweed with close to 100% efficacy. The high temperature at the surface causes a sufficient thermal gradient in the soil to result. Surprisingly, Johnson et al. achieved better results in dry soil, compared to wet soil, even though dry soil has more reflected light from the soil. The experiments performed on the seed stage were even more effective. The authors showed that a 20 second exposure to seed on the soil surface was 100% lethal to green foxtail, kochia, common lambsquarters, common purslane, and wild buckwheat.

This work by Johnson et al. demonstrated that concentrated solarization can have significant efficacy for weed control. However, they further concluded that a one second exposure, which equated to 36 meters/hour, was too slow for practical field application. Another recognized obstacle was the narrow depth of focus, which lead to poor control as plant canopy expanded at the later growth stages. A larger linear lens producing higher temperatures, as additional lens system to increase the depth of focus, should be considered for future considerations, according to the authors.

Phitthayarachasak et al. demonstrated another example of concentrated solarization by using an asymmetric compound parabolic concentrator. The setup shown in FIG. 2 performs soil irrigation with hot water (60-70° C.) in addition to focusing sun light on the soil surface. The hot water is heated through long copper tubes that are in contact with the collector surfaces exposed to the sun. Water is dropped at both the surface and at 30 cm depth. Recorded surface temperatures exceeded 50° C. They were able to decrease typical solarization times of four to six weeks down to four hours, while reducing the bacterial population density of *Ralstonia solanacearum*, the causative agent of wilt in crops leaves, more than five orders of magnitude at the surface. In addition, they demonstrated that temperature of the soil at different depths could be more uniformly increased if heated water was injected into soil at different depths. On a large scale, the generation of heat using electricity or gas in a combustion based boiler would be costly and physically unwieldy.

Referring to FIG. 3, a US patent application titled "Method and apparatus for controlling weeds with solar energy" by Guice et al. reveals air, ground and sea vehicles to expose weeds to (concentrated) solar energy. It discloses methods to control the intensity of light using robotic and autonomous systems, which are equipped with GPS or satellite based navigation and control. The importance of having instruments and vehicles solar powered (through converters such as PV cells or Stirling engines) to minimize gas consumption is disclosed in the publication.

In the foregoing discussion, various approaches attempting to meet and solve the aforementioned challenges and problems were presented. The inventors have recognized the benefits and advantages of providing solutions to these challenges and problems that are efficacious, scalable for practical agribusiness applications, and economically feasible; solutions not provided by past attempts.

SUMMARY

The embodied invention is directed to apparatus and methods for concentrated solar solarization. Non-limiting, exemplary and illustrative embodiments and aspects of the invention are presented herein below as applied to concentrated solar soil solarization ("$CS^3$"). A significant characteristic of the embodied invention will be seen as its distinction over the 'passive' solutions referred to above and known in the art; therefore, as disclosed and claimed herein $CS^3$ may be considered an 'active' solution.

Generally speaking, the embodied $CS^3$ solutions (systems, apparatus, components, methods, applications) will generate heat in the soil remotely by focusing sunlight from a moveable platform (e.g., truck; trailer) whose surface(s) supports a number of modular reflective tiles (e.g., mirrors or mirror arrays), which are mechanically steerable and controlled by a centralized controller (e.g., a laptop, smartphone, etc.) and concentrate the incoming sunlight by, e.g., 30×-50×. In an illustration of the embodied $CS^3$ solution, a truck or trailer is driven to the target location (e.g., farm) and parked near or on the field to be solarized. The truck can be driven on or off the farm to reach all sections of a farm by a combination of truck movement and solar tracking. The reflective tiles track the sun and reflect it to a desired point on the field with up to sub-milli-radian accuracy. They may be functionally similar to sun-tracking heliostats in large utility scale central receiver based CSP plants, albeit with considerably smaller dimensions. In certain aspects disclosed herein, the mirrors or modular reflective tile arrays may be referred to as Helio-Tiles (H-Tiles), and the moveable platform housing them as a Helio Mobile Unit (HMU). Regardless (within limits) of sun location, the mirror(s) and/or the H-Tiles can be multi-directionally steered by integrated actuators and control circuitry so that incoming solar radiation is actively reflected towards a desired spot on the target field. The solarization is performed with this concentrated sun-light, the area and power intensity (concentration factor) of which can be altered by altering the orientation of the mirrors on the H-Tiles. This steering operation and required electrical signals to the actuators can be generated by a microprocessor or a similar integrated electronic circuitry on the H-Tile. While the H-Tiles can be built to operate autonomously and fully independently, it is also possible that it maintains a wired or wireless link with a central control center or other H-Tiles in the field.

Further details about H-Tiles, multi-axis, large tilt angle mirror arrays, their construction, operation, and use can be found in Ardanuc et al., *Concentrated Solar Power Harvesting Using Self-powered, Wireless, Thin-profile, Lightweight Solar Tiles*, Journal of Solar Engineering, Vol. 33, August 2011 and International patent publication PCT/US2009/02181, the subject matters of which are herein incorporated by reference to the fullest extent allowed by all applicable laws and rules.

An embodiment of the invention is a solar-concentrating solarization system. The system includes a mobile platform that further includes at least one surface that is steerable about at one or more platform-coordinate axes, a plurality of optically reflective elements disposed on the at least one surface, and a controller operationally connected to either or both of the at least one surface and the plurality of optically reflective elements, wherein the plurality of optically reflective elements is steerable about one or more optically reflective element-coordinate axes, further wherein the system has at least one of a size, a shape, a configuration, and an optically reflective element density such that the system can provide a controllable concentrated solar output equal to or greater than 1× relative to a unit solar input. The embodied system may be characterized by the following illustrative, exemplary, non-limiting aspects:

wherein each of the plurality of optically reflective elements is steerable about at least one optically reflective element-coordinate axis;

wherein the plurality of optically reflective elements are comprised of a plurality of mirror tile arrays, further wherein the mirror tile arrays are steerable about at least one mirror tile array-coordinate axis that is different than the at least one optically reflective element-coordinate axis;

wherein the at least one surface of the mobile platform is steerable about at least one other platform-coordinate axis;

wherein the plurality of mirror tile arrays are heliostatic;

wherein the system can provide a controllable concentrated solar output between 30×-50× relative to a unit solar input;

wherein the system further comprises a self-contained power source;

wherein the self-contained power source is a battery;

wherein the self-contained power source is an energy-harvesting component wherein the system further comprises an optically transparent, weatherproof housing disposed about the optically reflective elements;

wherein the system further comprises an optically reflective element-positioning feedback sensor;

wherein the system further comprises a ground-target surface temperature sensor;

wherein the system further comprises a plurality of the solar-concentrating solarization systems coupled together;

wherein the system further comprises a secondary solarization component disposed in a manner to receive the concentrated solar output and redirect it to a target surface in the form of a secondary concentrated solar output that is equal to or greater than 1× relative to the unit solar input.

An embodiment of the invention is a method for solarizing a target surface. The method includes providing a solar-concentrating solarization system that generates a concentrated solar output, scanning the concentrated solar output over the target surface with a dwell time sufficient to raise the temperature of the target surface to a predetermined threshold value, measuring, in real time, the temperature of the target surface to provide a feedback instruction for the dwell time, and moving the system at a velocity equal to or greater than one km/hr. The embodied method may be characterized by the following illustrative, exemplary, non-limiting aspects:

wherein providing a solar-concentrating solarization system comprises providing the solar-concentrating solarization system as recited in claim 1;

wherein the target surface is a soil surface and the method of solarization comprises sterilizing the soil;

wherein the dwell time is sufficient to raise the temperature of the target surface to a predetermined threshold value that is greater than 50° C.

Additional features and advantages of the invention will be set forth in the detailed description to follow, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention and together with the description serve to explain the principles and operation of the invention.

BRIEF DESCRIPTION OF THE DRAWINGS

The present invention will be more fully understood and appreciated by reading the following Detailed Description in conjunction with the accompanying drawings, in which.

DETAILED DESCRIPTION OF NON-LIMITING, EXEMPLARY EMBODIMENTS OF THE INVENTION

Figure 1:
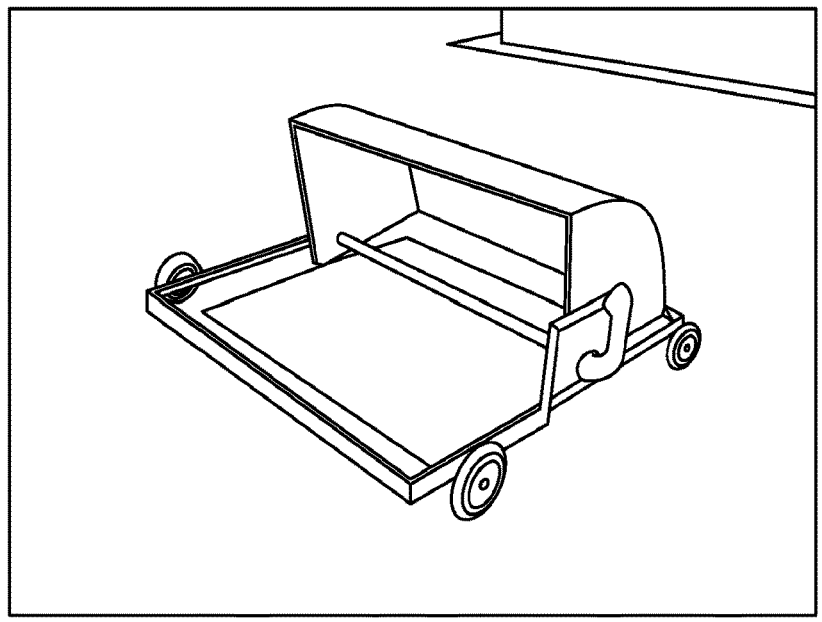
FIG. 1 shows a prior art curved linear Fresnel lens used to concentrate incoming sun-light by 25× and focus it on a line 1 cm×152 cm.
Figure 2:
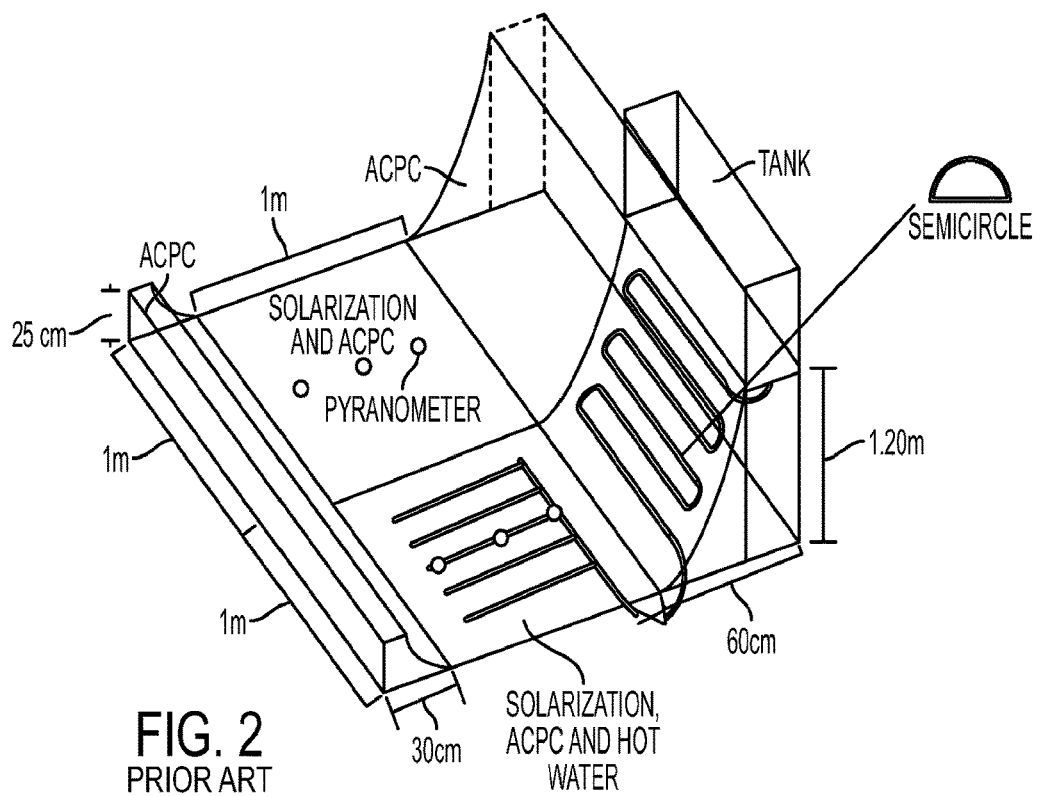
FIG. 2 shows a prior art concentrated solar soil solarization setup that uses an asymmetric compound parabolic concentrator and hot-water irrigation system heated by tubing placed in direct contact with the solar collector surfaces.
Figure 3:
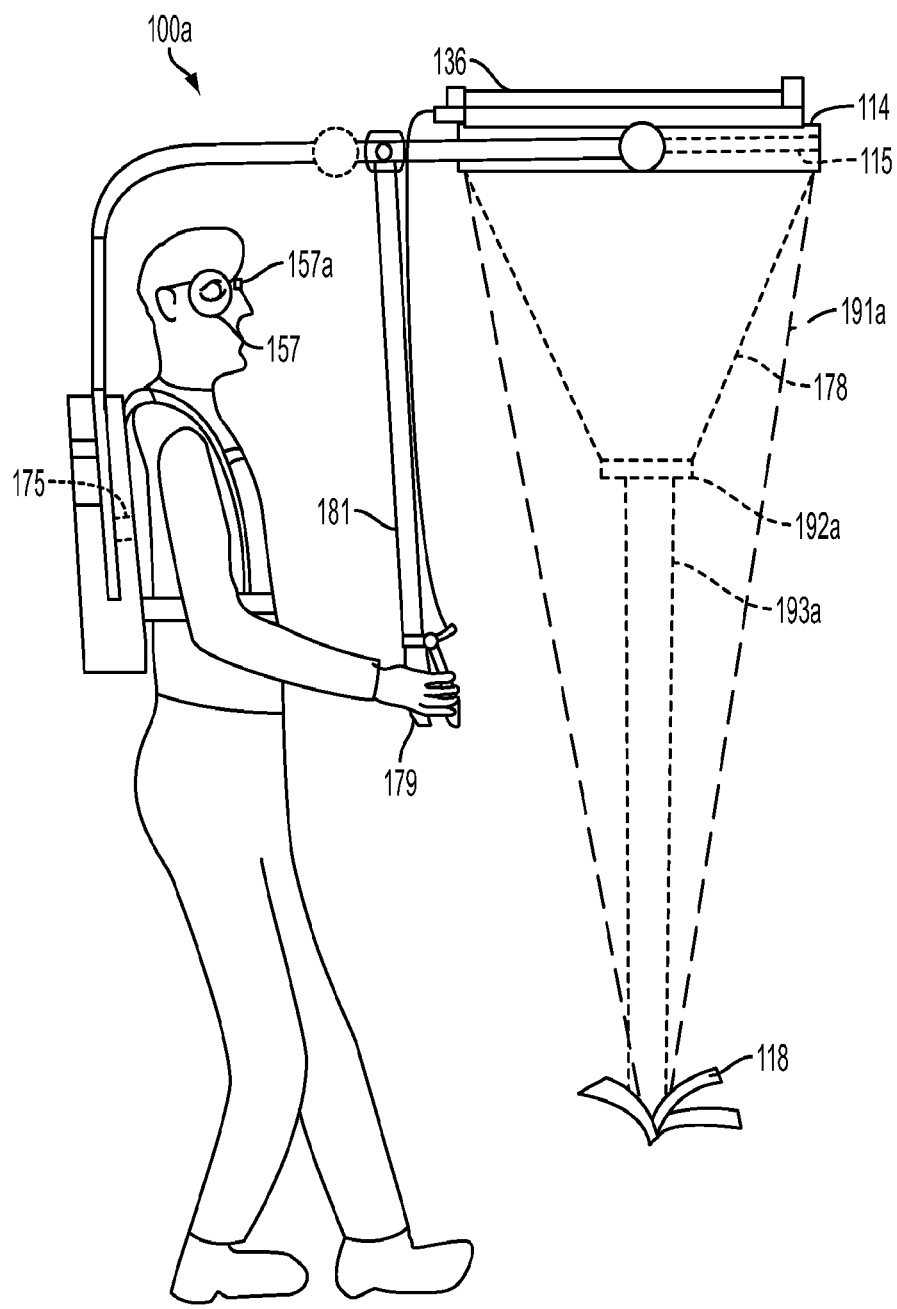
FIG. 3 shows prior art examples of weed control methods and apparatuses to focus concentrated solar radiation on weeds using ground, air, and sea vehicles.
Figure 3:
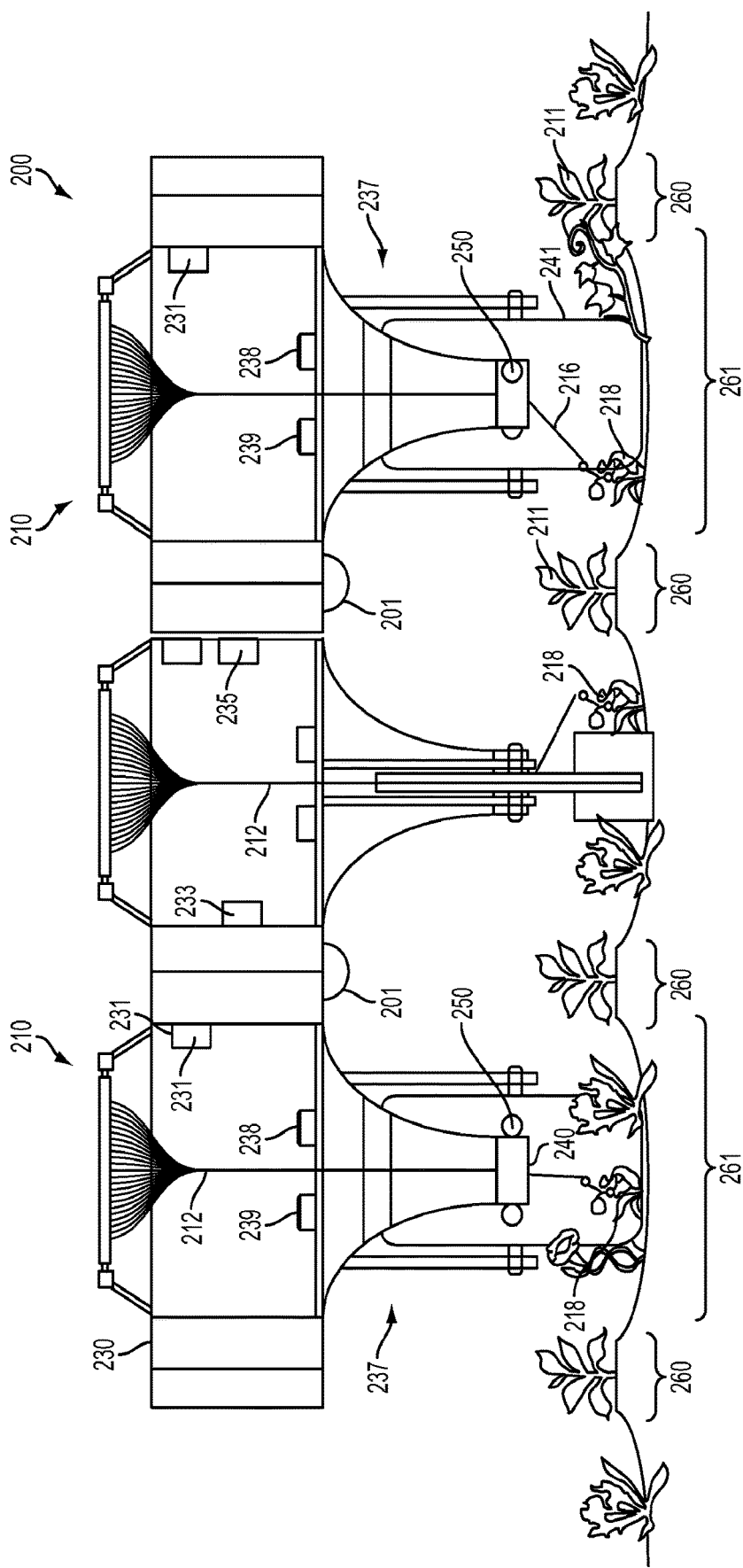
Figure 3:
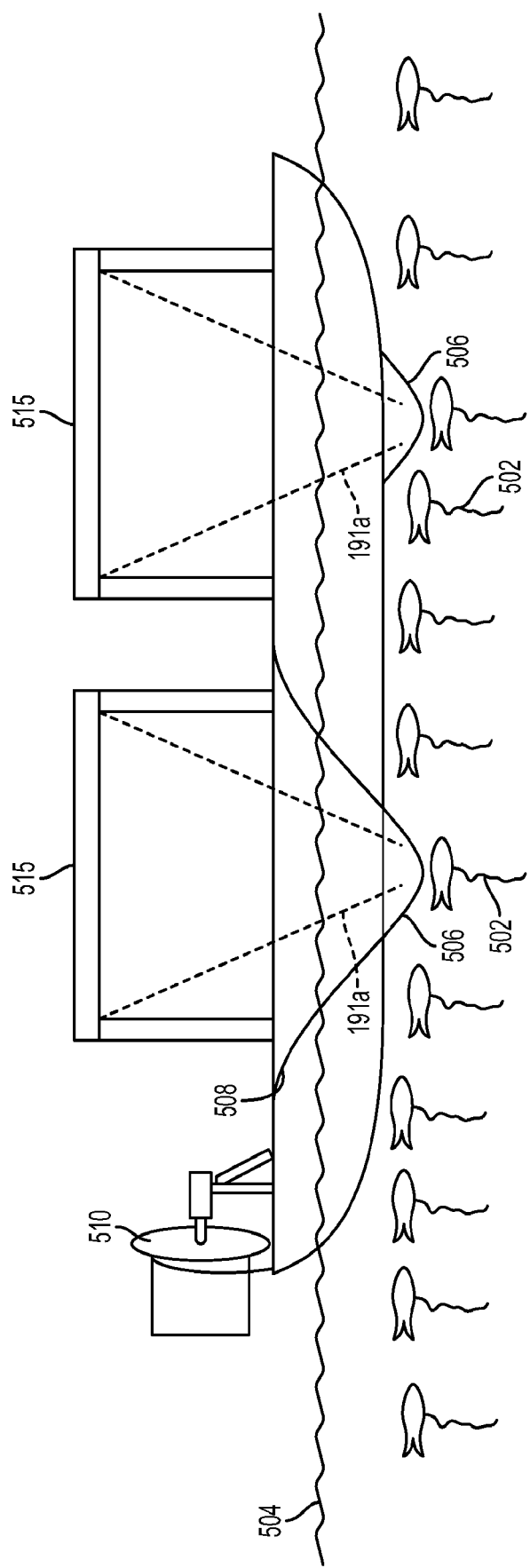
Figure 4:
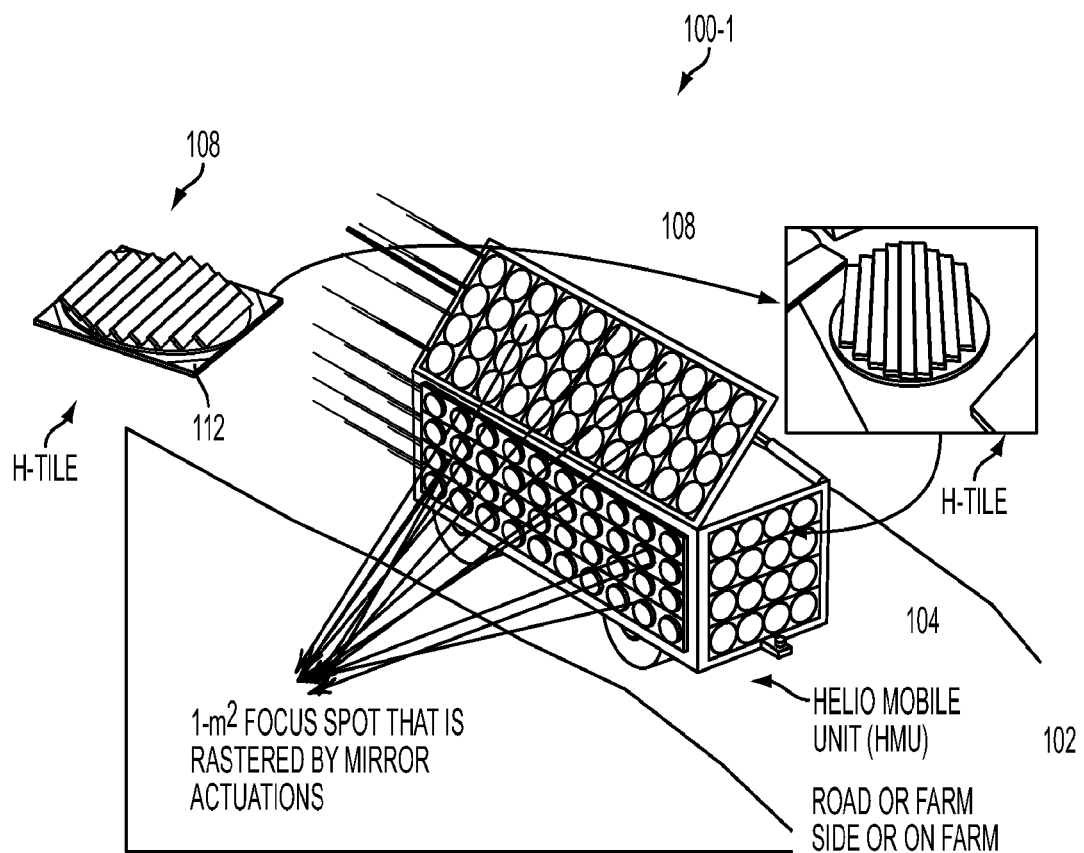
FIG. 4 schematically shows a $CS^3$ system including mobile platform (trailer) with steerable mirror tile arrays mounted on various surfaces focusing sunlight to a spot size of ≈1 $m^2$, raising the soil temperature to 200 degrees C. by spending about 1-5 seconds at each spot; a prototype heliostatic mirror tile is also shown and illustrated, according to an illustrative embodiment of the invention.
Figure 6:
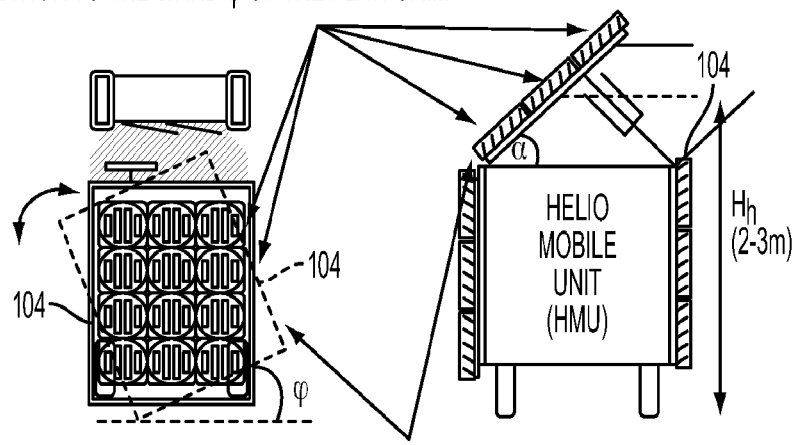
FIG. 6 schematically shows the steerable degrees of freedom of the tile support surfaces of the mobile platform of the $CS^3$ system illustrated in FIG. 4, according to an illustrative aspect of the invention.

A solar-concentrating soil solarization (CS³) system 100-1 is illustrated in FIG. 4. The system includes a mobile (actively, autonomously, or passively moveable) platform 102 illustrated as a Helio Mobile Unit (HMU) (but further including a truck, trailer, tractor, SUV, robotic vehicle, or the like). The HMU 102 further includes surfaces 104 that are steerable about orthogonal platform-coordinate axes φ and α as illustrated in FIG. 6. A plurality of optically reflective elements 108 in the form of Helio-Tiles is disposed on the surfaces 104. Exemplary Helio-Tiles are described in Ardanuc et al., id. and PCT/US2009/0218. A controller and associated optics/electronics 112 is operationally connected to either or both of at least one of the surfaces 104 and the Helio-Tiles. Each of the reflective tile arrays 108 is steerable about one or more optically reflective element-coordinate axes (azimuth and elevation). The mirror tiles thus can be steered individually and independently of each other or ganged as groups or a single ganged array.

In an exemplary aspect, the Helio-Tiles have dimensions of 50 cm×50 cm×4 cm (can change based on the application and cost framework), and house a single or an array of 2D steerable, mirror arrays. The Helio-Tiles incorporate one or more of the following: an actuator driver and control circuitry, computational power (through a microcontroller unit (MCU) or like), a link to communicate with a central command center that can be located on the platform or elsewhere via a wired or wireless link (TCP/IP, GSM, ZigBEE, or other protocols), sensors for feedback control of the mirror positions and environmental monitoring, power conditioning and battery, energy harvesting (solar, wind, vibration) devices to charge the battery and enable self-powered operation of the tile, a weather/proof case to protect the tile(s) from environmental effects (rain, dust, hail, sand, snow, wind, etc.), additional parts, motors, or apparatus for cleaning of the case.

Figure 5:
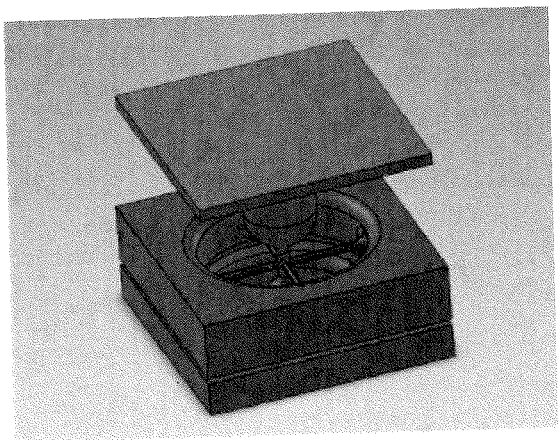
FIGS. 5(a-d) schematically show a pivoted-pixel design or 'compliant' type reflective tile in which the steering is performed by relative displacement of two planes connected to the pedestal of the mirror at two different levels by two motors in orthogonal directions, as an exemplary alternative to the 'hinged' type tile design of the H-Tile illustrated in FIG. 4, according to an illustrative aspect of the invention.
Figure 5:
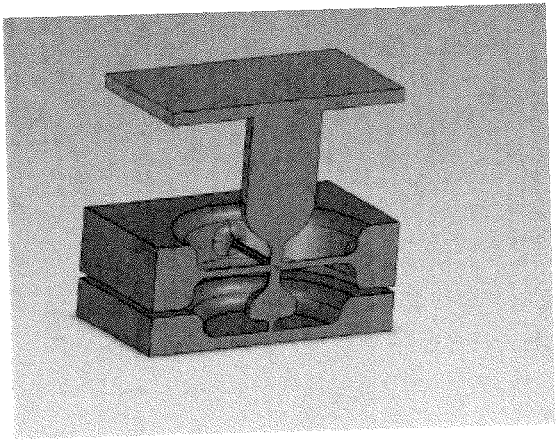
Figure 5:
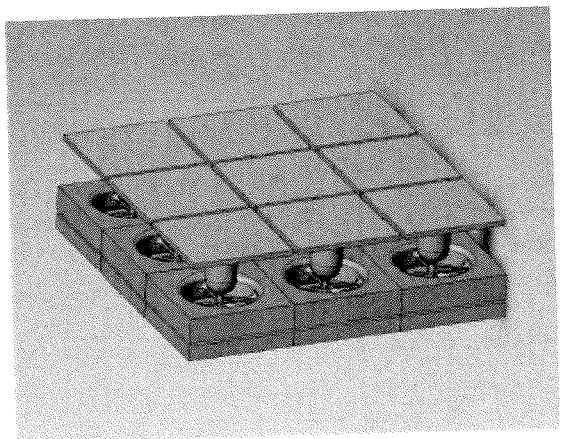
Figure 5:
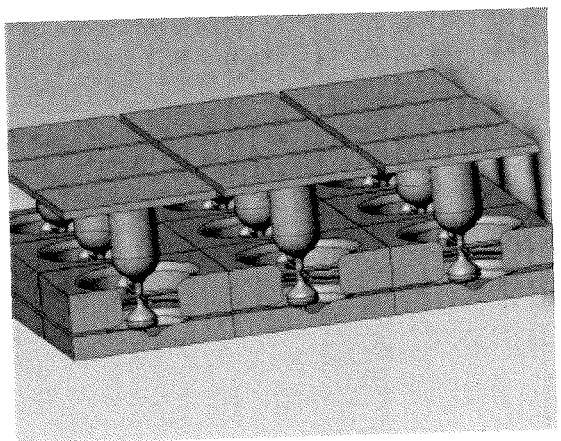

In the referenced descriptions of the Helio-Tiles, hinged latching mechanisms were disclosed as a means to actuate the mirrors. An exemplary 'compliant'-type design mirror element array is illustrated in FIG. 5. It will be appreciated by those skilled in the art that while the embodied invention is clearly enabled by the referenced Helio-Tiles, other reflective element components are feasible provided they meet the necessary limitations of size, weight, controllability, range and other factors suitable for the embodied invention.

Figure 7:
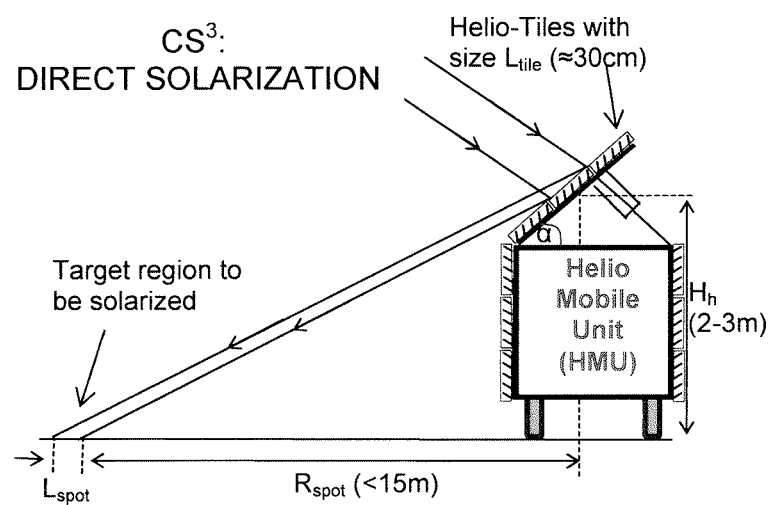
FIG. 7 schematically shows an embodied $CS^3$ Helio Mobile Unit (HMU) that is covered with 2D steerable mirror arrays (Helio-Tiles) to concentrate incident solar light and focus it on the target region to be solarized. In this exemplary illustration the point of focus can be scanned within a 15 m radius of the HMU to realize automated labor-free solarization, according to an exemplary illustration of the invention.

FIG. 7 illustrates an exemplary application of an embodied CS³ system for direct solarization of a field using an HMU as illustrated in FIGS. 4 and 6. Here, $L_{spot}$ is the length of the soil spot being solarized (i.e., target), $R_{spot}$ is the distance between the HMU and the target, $H_h$ is the height of the H-Tiles above the surface, and $L_{tile}$ is the length of the H-Tiles. One can write:

$$L_{spot} \approx \frac{L_{tile}\sin(\alpha)}{H_h} R_{spot} < \frac{L_{tile}}{H_h} R_{spot}$$

If $H_h$=2.5 m, $R_{pot}$=15 m, $L_{tile}$=0.3 m, then $L_{spot}$<1.8 m.

The above simple calculation shows that large concentration ratios are harder to realize when the target is further away from the HMU. In an exemplary, illustrative aspect, the solarization field is split into circular regions having a radius of ≈10-20 m. The HMU can then be moved from center to another of these regions. At each location, the HMU unit can perform scans of its surroundings to solarize the circular region it currently is in. Once the solarization is complete, the HMU goes to a neighboring region and the process repeats itself until the entire field is solarized.

During this process it is advantageous to monitor the soil temperature. By doing this, the Helio-Tiles on the HMU can be controlled on-the-fly to heat the soil to a desired temperature using a feedback-based approach. This also allows for non-idealities in the process such as topographical variations in the soil, non-uniformity in soil humidity across the field, varying air temperatures and cloudiness, and others. An IR camera, a visible image camera with a filter, or a remote temperature sensor disposed on a pan-tilt stage could be used to constantly monitor the temperature of the target region. The camera/sensor could be located on the HMU or it could be mounted overseeing the whole field if the image resolution is high enough. Since high speed measurement is not required, high signal-to-noise ratio measurements are possible.

Figure 8:
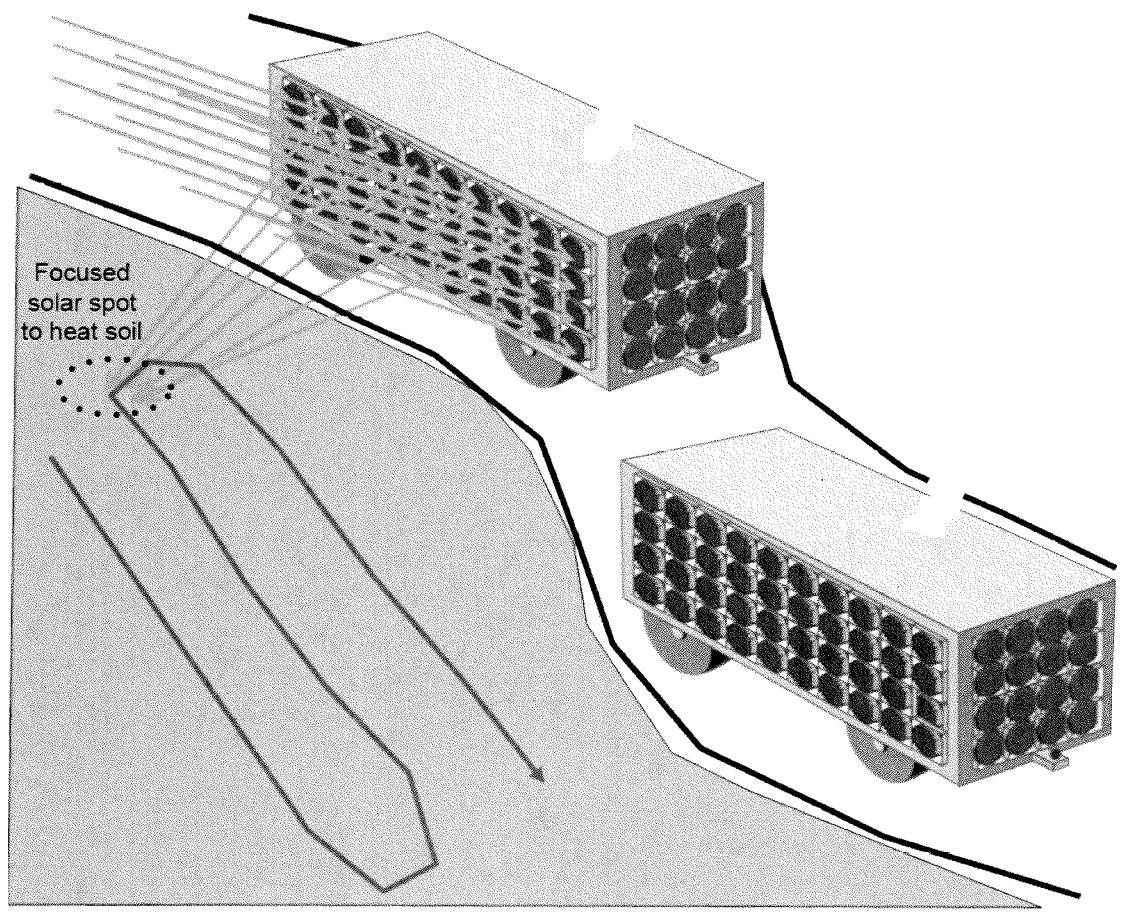
FIG. 8 schematically shows multiple HMU-based $CS^3$ systems that can be used singly or in a connected fashion, according to an illustrative aspect of the invention.

As illustrated in FIG. 8, multiple HMU-based CS³ systems can be used singly or in a connected fashion.

Figure 10:
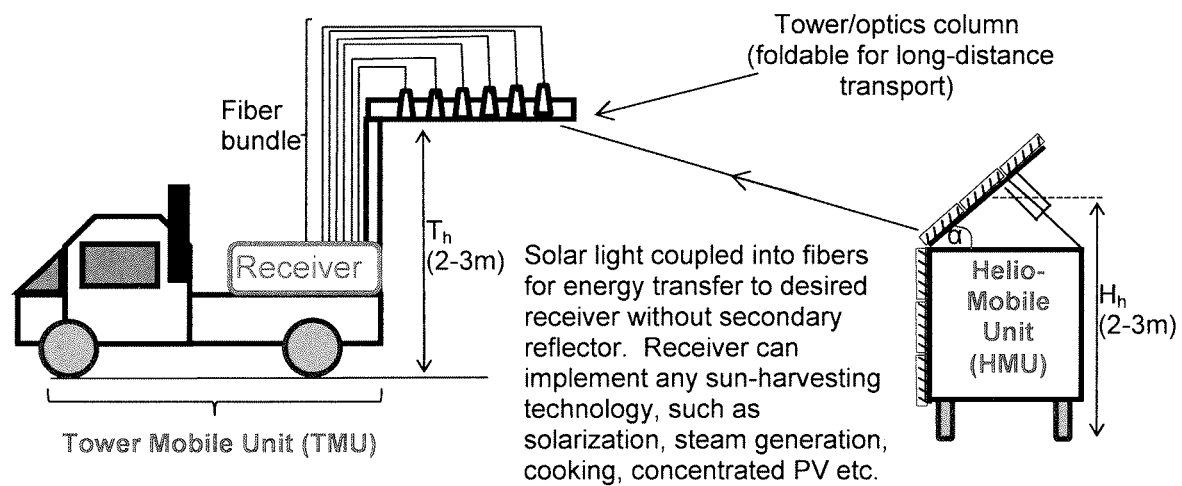
FIG. 10 schematically shows fiber based concentrators on a Tower Mobile Unit (TMU) to collect light at a receiver, which can be used for different solar harvesting applications. For illustration purposes the figure depicts the receiver on a truck, but the receiver can also be a tow-behind unit for solarization with output of the fibers exposed to soil directly within a hood. The figure illustrates the concept that the concentrated solar output from a HMU-based CS³ system can be directed to a secondary CS³ system for concentrated solar output, rather than directly to a target, according to an exemplary, illustrative aspect of the invention.
Figure 11:
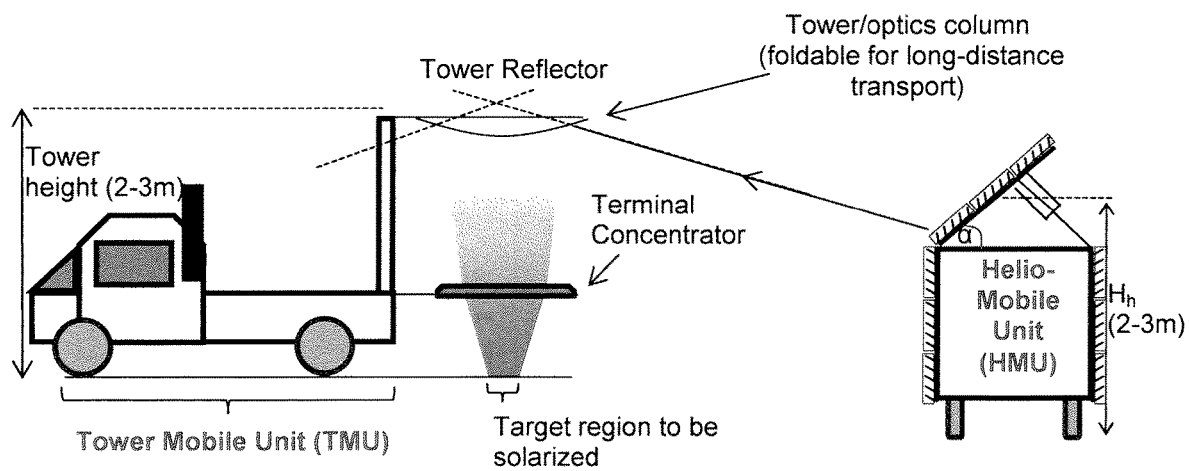
FIG. 11 schematically shows an alternative TMU-based CS³ system to that illustrated in FIG. 10 but demonstrating a similar secondary CS³ system for concentrated solar output, rather than directly to a target, according to an exemplary, illustrative aspect of the invention.

As illustrated in FIGS. 10 and 11, the concentrated solar output from a HMU-based CS³ system can be directed to a secondary CS³ system for concentrated solar output, rather than directly to a target. Furthermore, this receiver can include a tiller moving at the back of the TMU or a spade/rake array penetrating into the soil to a desired depth to uniformly transfer the heat of the receiver. This heat transfer ensures that the temperature of the treated soil of certain depth remains above a desired temperature long enough as required by the target soil sterilization efficacy. In order to reduce effects of shadowing, light-trapping, and cosine-loss, utility scale, central receiver-based CSP projects commonly use very high tower structures (>50 m). In the case of direct CS³ soil system described herein, the target is literally on the ground, which significantly limits the concentration factors and the minimum target size for a given tile and HMU design. This is made worse by the limited elevation of the Helio-tiles off the ground (e.g., 2-3 m), as raising the whole HMU platform meters-high above the ground may be problematic especially in the presence of strong winds.

These limitations can be mitigated by using a secondary reflector/concentrator, which locally collects the light at a higher level and then focuses it on the target soil. As illustrated, this approach may use a secondary unit (e.g., Tower Mobile Unit (TMU)), which implements a moving secondary reflector tower. As the TMU dictates the region to be solarized, this approach requires the challenging task of not only tracking the position of sun accurately, but also tracking the position of the TMU accurately as well. Differential GPS, triangulation, and image processing offer ways to address this.

Figure 9:
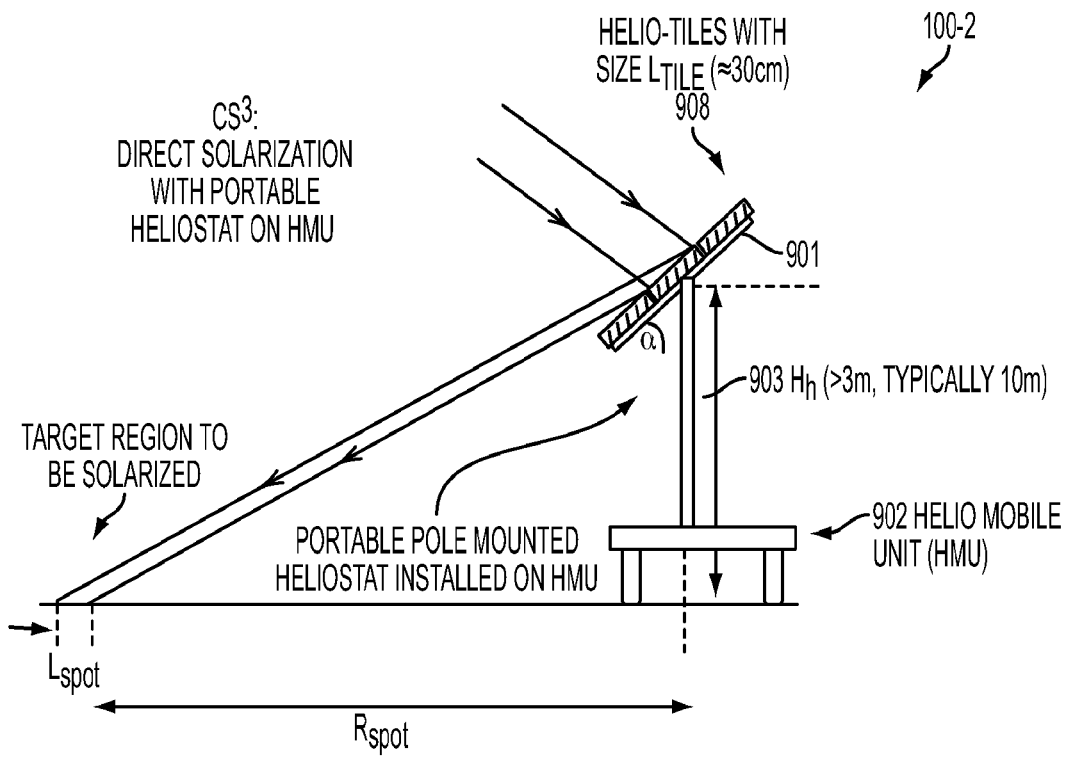
FIG. 9 schematically shows an embodied $CS^3$ system that uses a portable tower on the HMU to allow for automatic scanning of a larger field at higher concentration factors, according to an alternative, exemplary illustration of the invention.

FIG. 9 schematically shows an embodied $CS^3$ system 100-2 that uses a portable tower on the HMU to allow for automatic scanning of a larger field at higher concentration factors. As illustrated in FIG. 9, a foldable, crane assembly 901 is installed on the HMU 902 to realize a portable tower 903 with Helio-Tiles 908 installed on top so that the mirrors oversee the field target from a much higher level above the ground than as in FIG. 4. This approach provides a way of realizing larger H-tile operation height $H_h$, and further allows scanning a large field at once without sacrificing concentration factors at the target region. Foldability of the tower allows stable transportation within the farm field, which will be less frequent due to increased tower height that allows solarization of larger fields at once (i.e., large $R_{spot}$).

Implementations of the subject matter and the functional operations described herein can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products; i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" or "data processing unit" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

Certain features that are described herein in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document and attached appendices should not be understood as requiring such separation in all embodiments.

Only a few implementations and examples are described and other implementations, enhancements and variations can be made based on what is described and illustrated herein.

All references, including publications, patent applications, and patents, cited herein are hereby incorporated by reference to the same extent as if each reference were individually and specifically indicated to be incorporated by reference and were set forth in its entirety herein.

The use of the terms "a" and an and the and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A solar-concentrating solarization system, comprising:
  a mobile platform, having at least one surface that is steerable about at least one platform-coordinate axis via at least one first actuator, the at least one surface comprising a plurality of optically reflective elements steerable about at least one optically reflective element-coordinate axis via at least one second actuator;
  a remote temperature sensor to remotely measure a temperature of a soil spot illuminated by the plurality of optically reflective elements; and
  a controller operatively connected to at least one of the at least one first actuator and the at least one second actuator to steer a respective one or more of the at least one surface and the plurality of optically reflective elements, the controller being configured to select a soil spot for solarization, to steer the respective one or more of the at least one surface and the plurality of optically reflective elements to target the selected soil spot for solarization, to monitor a temperature of the soil spot measured by the remote temperature sensor, and to determine if the temperature measured by the remote temperature sensor for the selected soil spot has reached a temperature of at least 50° C.

2. The system of claim 1, wherein the plurality of optically reflective elements are comprised of a plurality of mirror tile arrays, further wherein the mirror tile arrays are steerable about at least one mirror tile array-coordinate axis that is different than the at least one optically reflective element-coordinate axis.

3. The system of claim 2, wherein the plurality of mirror tile arrays are heliostatic.

4. The system of claim 1, wherein the at least one surface of the mobile platform is steerable about at least one other platform-coordinate axis.

5. The system of claim 1, wherein system can provide a controllable concentrated solar output between 30×-50× relative to a unit solar input.

6. The system of claim 1, further comprising a self-contained power source.

7. The system of claim 6, wherein the self-contained power source is a battery.

8. The system of claim 6, wherein the self-contained power source is an energy-harvesting component.

9. The system of claim 1, further comprising an optically transparent, weatherproof housing disposed about the optically reflective elements.

10. The system of claim 1, further comprising a plurality of the solar-concentrating solarization systems coupled together.

11. The system of claim 1, further comprising a secondary solarization component disposed in a manner to receive the concentrated solar output and redirect it to a target surface in the form of a secondary concentrated solar output that is equal to or greater than 1× relative to the unit solar input.

12. The system of claim 1, wherein the controller is further operatively connected to adjust, based on the temperature measured by the remote temperature sensor for the selected soil spot, one or more of the at least one surface and/or one or more of the plurality of optically reflective elements.

13. A method for solarizing a target surface, comprising:
  providing a solar-concentrating solarization system according to claim 1;
  solarizing the target surface with a dwell time sufficient to raise the temperature of the target surface to a predetermined threshold value that is at least 50° C.; and
  measuring, in real time, the temperature of the target surface to provide a feedback instruction about the dwell time.

14. The method of claim 13, wherein the target surface is a soil surface and the method of solarization comprises sterilizing the soil.

15. The method of claim 13, further comprising a step of adjusting, based on the feedback instruction for the selected soil spot, one or more of the at least one surface and/or one or more of the plurality of optically reflective elements.

* * * * *